Figure 5:
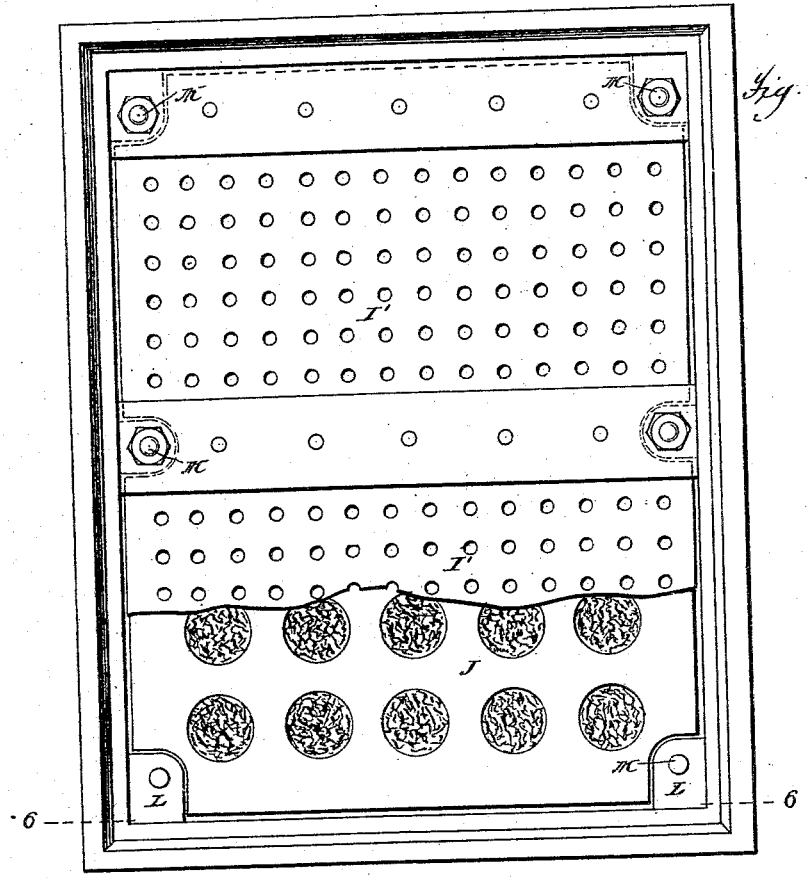

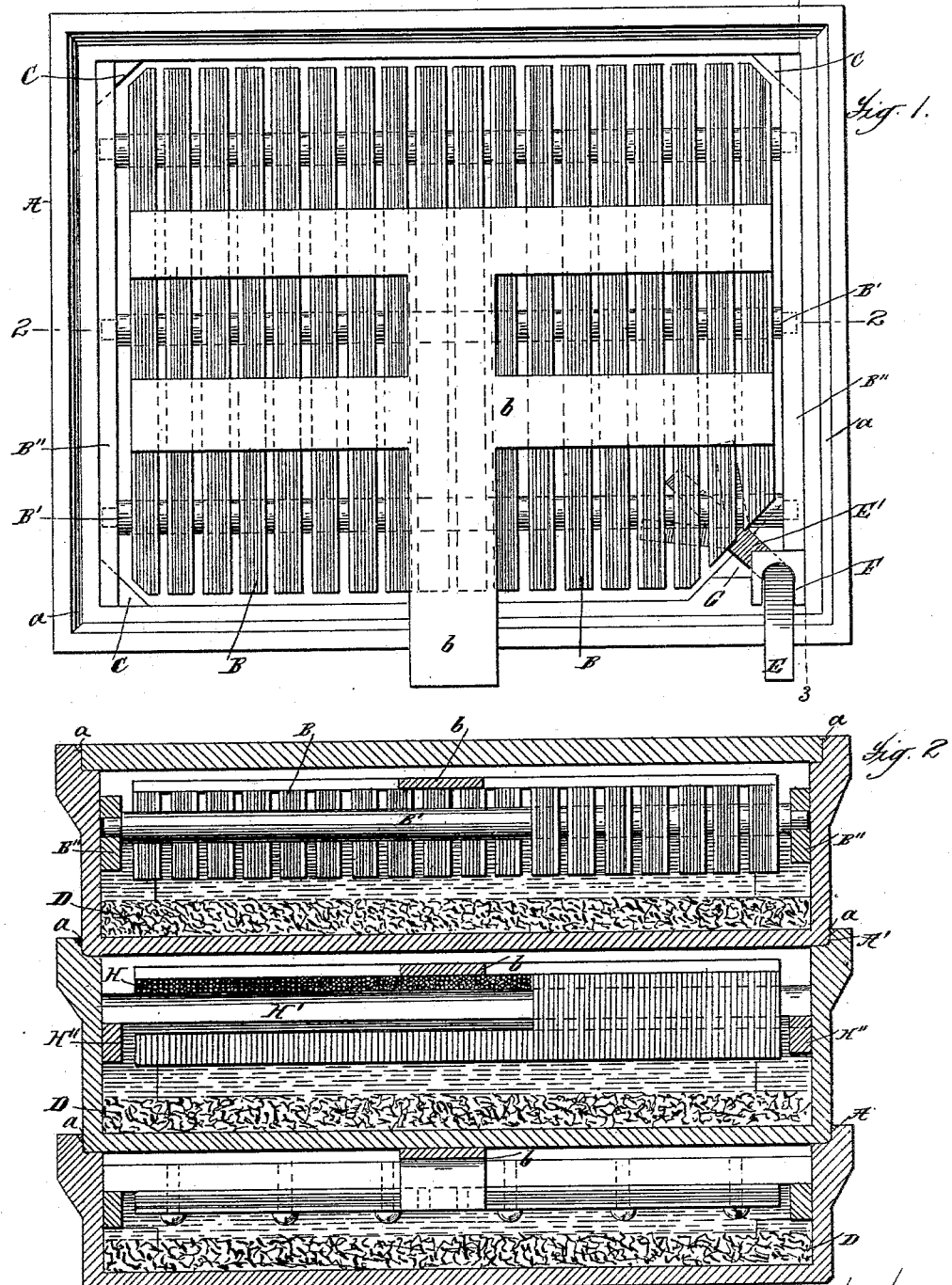

(No Model.) 3 Sheets—Sheet 2.
W. MAIN.
SECONDARY BATTERY.
No. 401,289. Patented Apr. 9, 1889.
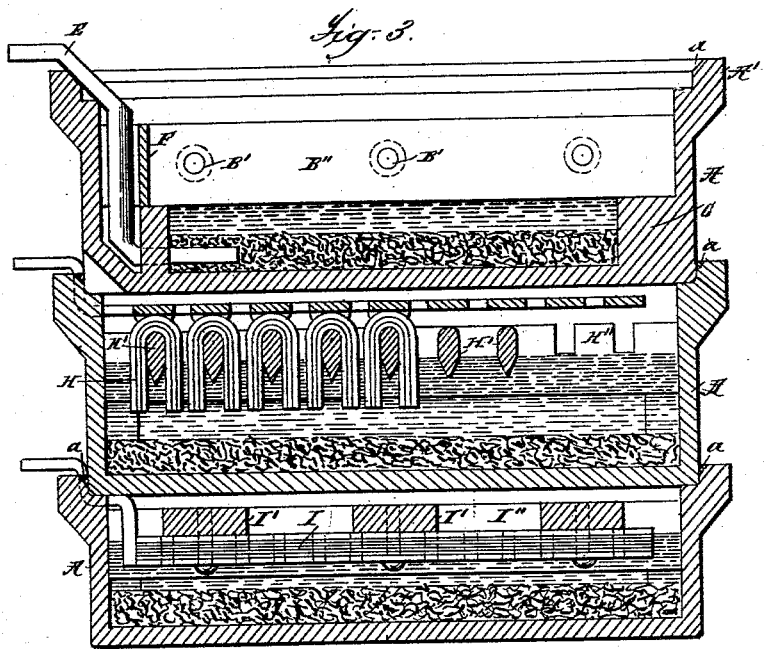
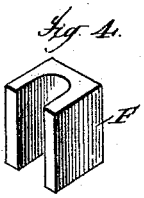
WITNESSES
J. J. Kennedy
Geo. H. Botts
INVENTOR
William Main
By Philipp Philp Hoory
Atty (No Model.) 3 Sheets—Sheet 3.

W. MAIN.
SECONDARY BATTERY.

No. 401,289. Patented Apr. 9, 1889.

WITNESSES
J J Kennedy
Geo H Botts

INVENTOR
William Main
By Philipp Phelps & Hoary
Attys

UNITED STATES PATENT OFFICE.

WILLIAM MAIN, OF BROOKLYN, NEW YORK, ASSIGNOR TO THE RIVER AND RAIL ELECTRIC LIGHT COMPANY, OF WEST VIRGINIA.

SECONDARY BATTERY.

SPECIFICATION forming part of Letters Patent No. 401,289, dated April 9, 1889.

Application filed January 10, 1889. Serial No. 295,958. (No model.)

*To all whom it may concern:*

Be it known that I, WILLIAM MAIN, a citizen of the United States, residing at Brooklyn, county of Kings, and State of New York, have invented certain new and useful Improvements in Storage-Batteries, fully described and represented in the following specification and the accompanying drawings, forming a part of the same.

My invention relates to secondary batteries and in part to those formed to operate upon the general principle of the battery patented to Abraham V. Meserole March 22, 1887, No. 359,877; and it consists in part of an improvement upon that battery.

I have found that a horizontal form of battery instead of an arrangement in which the plates are vertical is in practice much better for a battery acting upon the principle of the patent referred to. Where the plates are vertical, the tendency of the zinc sulphate given off into the liquid from the plate during the process of discharge and the zinc sulphate normally in the electrolytic liquid, in case zinc salts are used therein, is to drop to the bottom of the cell and accumulate on the lower parts of the plate, in this way in time more or less disorganizing the structure of the cell and causing a liability to short-circuiting of the plates at their bases. In the form of cell which I propose to adopt, the plates being horizontal instead of vertical, the superior gravity of the zinc in solution merely tends to throw it back upon the hydrogen pole-piece, where it properly belongs, and has no tendency toward the disorganization of the battery or the production of a short circuit. A further superiority of the form of cell which I apply to this battery arises from the fact that after the cell has been discharged of its stored-up or secondary current it is in a condition to act as a primary battery and give forth a primary current of a considerably less electro-motive force, however, than that given off when the battery acts in its secondary capacity. The effect upon the battery of this generation of a primary current is injurious where the plates are vertical, for the reason that it causes the zinc plate to be irregularly dissolved, whereby starting-points for further irregularities arising from the electrolytical deposition of the metal are furnished, so that in the process of use the irregularities of the zinc plate may be increased until they furnish short-circuiting connections between the plates or result finally in the disorganization of the plate. Were it always possible to place batteries of this sort in skillful hands, the danger incident to the use of the battery as a primary cell could be avoided; but as the batteries must generally be placed in the hands of unskilled persons this liability of injury to the battery is a serious one in practice. It is absent from the horizontal form of cell which I propose, for the reason that there will always be a tendency to level off the irregularities of the horizontal zinc plate however formed, the projections from the mass of the plate being acted upon more effectively by the discharging-current than the other portions of the mass, and being thereby more readily dissolved and the deposit from the sulphate being thrown equally over the entire surface of the plate. It is thus obvious that the normal tendency of the process of charge and discharge will be to promote and maintain the homogeneity of the positive plate or pole-piece and to distinctly and effectively oppose short-circuiting formations. Thus much closer proximity of the plates to each other and consequent economy of space and weight is possible than where the plates are vertical.

My invention further consists in a special formation of the hydrogen pole-piece of this battery; and it consists in this respect in the use therefor of granulated zinc lying in the bottom of the cell and supplied with a sufficient quantity of mercury to thoroughly amalgamate it. The zinc may be granulated in any of the well-known ways. Thus it may be thrown while molten into water, or it may be kept in a state of agitation while cooling, which results in a finer and more uniform and on that account preferable granulation; or it may be finely subdivided by grinding. This form of hydrogen pole-piece I find to be specially adapted to the horizontal disposition of the plates and particularly susceptible to the equalizing tendencies of the operation of the chemical processes of the battery above referred to and to be for these reasons a superior formation of pole-piece. One process employed by me for forming up the hydrogen pole-piece constructed in this way consists in depositing upon its surface from a mercury and zinc solution in the cell the zinc and mercury sponge referred to in the aforesaid Meserole patent, and then mechanically mixing or stirring the mass, so as to throw down the sponge among the zinc granules, and then, if desired, further continuing the sponge formation, and again mixing until the mass in the bottom of the cell contains a quantity of the aforesaid sponge distributed throughout it. I find that the pole-piece so formed is one of the most effective hydrogen pole-pieces which can be used in the battery referred to. The process will not be substantially changed if the amalgamated granulated zinc be immersed in a mere acid bath containing no zinc or mercury solution. The action of the current then causes an electrolytically-formed layer of zinc-mercury sponge upon the exposed surface of the zinc granules, and by stirring this is distributed through the mass and a new surface exposed to current action. Again, the electrolyte used may contain zinc in solution without mercury, mercury being present upon or in the hydrogen pole-piece; but if zinc is not originally in the solution more or less will be taken up from the pole-piece, and the result will be practically the same. This process I have claimed in an application filed of even date herewith, Serial No. 295,960.

My invention further consists in a peculiar treatment of the plates of lead or other plates used for secondary batteries before they are subjected to the forming process; and it consists in this respect of giving such plates a coating of powdered plumbago, graphite, or other finely-divided carbon. This I apply to the surface of the plates by means of a brush or in any other suitable manner, spreading it evenly, so as to form a thin continuous coating upon the metallic surfaces. If necessary, the plates may be moistened, in order to cause the finely-divided carbon to adhere more perfectly; or the carbon may be moistened with water or other liquid and applied to the plates in the form of a paste. The efficiency of the carbon consists in its superior conductivity, whereby electrical action upon the plate in the process of formation is facilitated and expedited, and whereby a superior degree of conductivity in the plate after it is formed is permanently secured. I find that this process is particularly valuable when applied to the laminated form of plate heretofore invented and patented by me in Patent No. 359,934, and that when the thin plates so treated are fastened together to form a compound plate the graphite, being unattacked by the electrolytic action, is effective to maintain conductivity during and after the oxidation of the plates, by which their metallic continuity is more or less destroyed. I do not confine myself to the use of plumbago or graphite for this purpose. Any other form of finely-divided carbon may be employed.

My invention further consists in a new formation and organization of battery-cells more compact, simple, and less liable to disarrangement by jarring or rough usage than any heretofore devised, as will hereinafter be more fully set forth, and, further, in certain features and details of construction, all of which matters are hereinafter fully described, and the points of novelty set forth in the claims.

Figure 6:
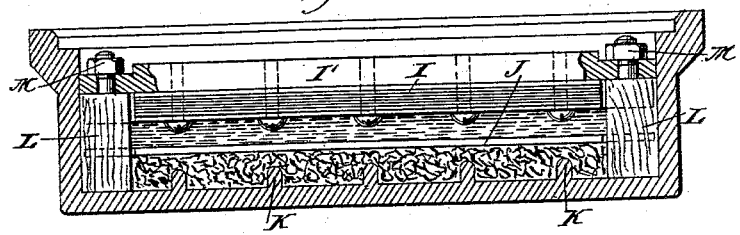

In the drawings annexed, forming part of this specification and illustrating this invention, Figure 1 is a plan view of a secondary battery made and organized according to my invention. Fig. 2 is a vertical section of the same on the line 2 2, Fig. 1, certain parts of the battery being shown at an elevation. Fig. 3 is a partial section of the same on the line 3 3, Fig. 1. Fig. 4 represents a detail on a large scale, and Figs. 5 and 6 illustrate a modification.

The construction and organization of the batteries are as follows: I use a series of cells, A, of hard rubber or other material impervious to the electrolytic liquid, of a shallow flat form, each cell being adapted to contain one hydrogen and one oxygen element and the electrolytic fluid therefor, these cells being adapted one to receive another in a vertical tier, each cell above the lowest resting upon the one below it, and being held from lateral displacement by a flange, A', or equivalent upward projection, or other locking or retaining device, as may be preferred. The bottom of each cell thus forms a cover for the cell next beneath it, and I propose to prevent escape of the liquid by providing a notch, $a$, about the said bottom and filling it with some plastic material not acted upon by acids, and which can be readily inserted into and removed from the notch when the battery is organized and taken apart, respectively. In each cell are arranged two elements—the upper or oxygen pole-plate, consisting of any of the known forms of oxygen-plates, or such an element as shown in the upper cell of Fig. 2—a series of short, compound, laminated plates, B, strung upon rods B', of wood or other suitable material, said rods B' being tenoned at their ends to fit into corresponding holes in side pieces, B'', which in turn rest upon triangular corner-pieces C, one of which is provided in each corner of the cell. The relative positions of the plates B are maintained upon their supporting-rods by plates $b$, soldered to them at their top edges and serving as a connecting-piece between the plates and the external circuit.

The hydrogen pole-piece consists of a layer of granulated zinc, D, arranged in the bottom of the cell and provided with a suitable quantity of mercury. The successful action of the battery does not depend upon the use of any specified proportion of mercury to zinc. There should be enough present to amalgamate the zinc; but a very small quantity is sufficient for the purpose, and the battery will work effectively if the mercury is present in excess. I find that good results are obtained when mercury forms fifteen to twenty-five per cent., by weight, of the hydrogen pole-piece. The mercury may be added after the granulated zinc is introduced into the cell, or the zinc may be amalgamated and afterward placed in the cell. Connection with this layer of zinc and mercury is preferably made by means of a strip or rod of metal, E, passing into the cell at one corner thereof and through a protecting-block of insulating material, F, placed in said corner and shaped, preferably, as shown in Fig. 4, said block F resting upon a corner-piece, G, somewhat larger than the corner-piece C, provided in the other corners of the cell. Below the block F the conducting-strip E passes through a passage-way provided in said block G, and thence into the amalgamated zinc layer, separating at its inner end into a crow-foot, E', embedded in the granulated mass. This construction of connecting metal strip and insulating protection therefor is simple and has little liability to disarrangement. A part of the block G, as shown in Fig. 1, rises to or near to the top of the cell, and serves in conjunction with the end of the adjoining piece B'' to hold the block F in position.

In the middle cell, Figs. 2 and 3, I have shown a modification in the formation of the oxygen pole-piece, wherein said pole-piece is formed of several masses of wire, of lead, or other proper material, H, respectively hung over stringers H', which in turn are supported by end pieces, H'', similar to the pieces B'' of the upper cell, and which are, as in the said cell, supported by corner-pieces.

In the lowest of the several cells shown in Figs. 2 and 3 I have shown a still further modification in the form of the upper or oxygen plate, said plate consisting in this instance of a horizontal compound laminated plate, I, made according to my previous invention and patent, No. 359,934, which plate is attached to stringers I', supported as before on end pieces, I'', resting upon the corner-pieces arranged in the cell, as heretofore described. The laminæ from which this compound plate is made up were, before being put together to form the compound plate, given a coating of plumbago or other finely-divided carbon for the purpose above mentioned. This coating of carbon maintains conductivity in the mass of the plate after the metallic continuity of the thin plates has been more or less destroyed. The liquid having access to many parts of the plates, by reason of the peforations, and the carbon assisting conductivity from the starting-points afforded by the perforations, I secure a compact plate with very extensive surfaces fully exposed to the action of the liquid. I do not confine myself in this part of my invention to the use of finely-divided carbon, as carbon in sheet form may be used in place thereof, and such a construction is intended to be within the scope of my broadest claims. I have shown and claimed it specifically, however, in an application filed of even date herewith, Serial No. 295,959. I prefer to provide a layer of carbon between each two laminæ; but good results may be obtained if a lesser number of layers of carbon than of laminæ be employed. Other materials—such as antimony inactive in the electrolyte, but conductive of electricity—may be placed between the laminæ of the compound plate instead of carbon without departing from the broad scope of my invention, carbon being merely the best material now known to me for the purpose. With regard to this part of my invention the form or construction of pole-piece to which the graphite, &c., is applied is of comparatively small importance, as also is the metal of which it is composed, the gist of the invention, broadly considered, consisting in the use of the carbon to promote and maintain conductivity throughout the metallic mass.

In each of the lower cells of the tier the connection with the hydrogen pole-piece is made as already described with reference to the upper cell, or, if preferred, in any other suitable manner. The several cells of the battery, when thus organized, are connected together in series or otherwise, as desired, by means of the projecting ends of the pole-piece connections in the usual manner. The cells, when arranged in tiers, may be placed in boxes or crates, or other provision may be made against relative displacement where the battery is to be subjected to jarring motion or other disturbing cause. In ordinary use, however, the upward projections A' will be a sufficient provision for this purpose.

In addition to the several advantages heretofore pointed out possessed by this construction of cell, I desire to call particular attention to that of ready inspection which it affords in case any part of the battery requires repair or adjustment. Each pair of elements can be separately inspected without unsoldering any connections or disturbing any of the permanently-attached parts of the cell and without in any manner tampering with the other pairs of elements in the battery. No rough usage can, under ordinary circumstances, cause any permanent disarrangement of any parts of the cell, since, however jarred, the elements have a tendency to immediately return to their normal and working position as soon as the cell rests in a horizontal plane. It will also be observed that there is no danger to be apprehended from the buckling of any of the elements of the battery, and, as before stated, the liability to the formation of short-circuiting bridges is reduced to a minimum.

Where the battery is to be subjected to exceedingly rough handling, it may be desirable to provide some absolute separation between the oxygen-plate and the granulated material. Under such circumstances I propose to place upon the granulated material a plate of zinc, J, (shown in Fig. 6,) preferably perforated to permit the free passage of the electrolytic liquid to the granulated material beneath it, and which will prevent the piling up of said granulated material upon the tipping of the cell. If preferred, a plate of any other desired material—such as, for instance, hard rubber or lead—may be substituted for the zinc plate.

In Fig. 6 I have shown a still further provision for this purpose, which consists of ridges K, formed at intervals in the bottom of the cell and adapted to prevent lateral motion of the granulated material under influence of gravity should the cell be tipped. These ridges may be run, if desired, in both directions of the cell.

In Figs. 5 and 6 I have shown a modified support for the upper plate, by which certain economy of space is secured. This modification consists in providing legs L, tenoned at their upper ends and set into holes in the oxygen-plate and secured therein by nuts M. These legs and nuts are preferably of hard rubber or some other non-conducting material. As an electrolyte in the battery herein described, I prefer to use a solution containing zinc and mercury; but I may obtain good results by the use of a mere dilute acid bath, the hydrogen pole-piece being amalgamated. The material for the oxygen-plate which I prefer is lead; but I do not confine myself to that material.

While I may separate each pair of elements from the other elements by placing each pair in a separate cell, I do not confine myself to this construction, but may use alternating plates placed in a vertical tier and contained in a single bath and a single cell, the supports for said plates and the connections to them being arranged in any of the usual and well-known ways.

While I have shown in this application a number of separate improvements, I wish it understood that I do not limit myself to the use of any or all of them in conjunction with any of the others, but that I claim each separately as applied to any battery to which it can be adapted, and independently of the construction or operation of said battery in other respects. Thus, for example, I desire to protect the form of the cell and its peculiarities of construction, not only for use with the Meserole three-volt battery, but with all forms of batteries to which they are applicable, and so of my other several improvements.

I do not limit myself to a battery formed of a hydrogen-plate of granulated material nor having a hydrogen-plate entirely composed of zinc and mercury, as other materials may be substituted in part for the zinc or the pole-piece without substantial disadvantage. In fact, any conducting material which will serve as a basis for zinc and mercury deposition will furnish a foundation for a hydrogen-plate when zinc and mercury salts are used in the solution, or the hydrogen pole-piece may be composed in part of zinc and in part of a material more or less comparatively negative in the battery. So, too, where zinc is used as a constituent of the hydrogen pole-piece, it is not essential to the operation of the battery that zinc should be contained in solution in the electrolyte.

The laminated perforated plate of my above-mentioned patent, No. 359,934, is of particular value in combination with the zinc-mercury pole-piece, for the reason, among others, that it permits the bringing of a sufficiently large active oxidizing-surface into close proximity to the zinc-mercury amalgam to balance the hydrogen-occluding capacity of the zinc-mercury formation. No other form of plate with which I am acquainted is capable of accomplishing this result and thus of securing from the zinc-mercury pole-piece its maximum effective capacity. The effectiveness of the laminated pole-piece in this respect is of course increased considerably by the application of finely-divided carbon or other conductive inert material to the laminæ, as above described.

While I prefer to place the hydrogen-plate below the oxygen, I do not limit myself to that arrangement, as good results may be obtained when the hydrogen-plates are placed uppermost. When a number of pairs of plates are placed one above the other in a single cell, as above suggested, it makes little difference whether the hydrogen or oxygen element of each pair is uppermost. While I regard zinc in granulated form as preferable, I may use zinc in the form of a plate or block, and I intend to include this construction in those claims wherein the form of the zinc is not specified.

Having thus described my invention, what I desire to protect by Letters Patent is—

1. A secondary battery the hydrogen pole-piece whereof is composed in whole or in part of zinc and wherein mercury is present either in solution or as a constituent of the hydrogen pole-piece, the plates of which battery are in close proximity and horizontally placed, one or more of the hydrogen-plates being immediately below an oxygen element, said horizontal disposition facilitating the even distribution of precipitated metal upon the hydrogen-plates and preventing the accretion upon the hydrogen-plate of short-circuiting formations, substantially as described.

2. A secondary battery whereof the active material of the hydrogen pole-piece consists of mercury electrolytically combined with zinc, the electrolytic formation being more or less built up during charge and broken down during discharge, the plates whereof are in close proximity and horizontally placed, said horizontal disposition facilitating and promoting the even distribution of the electrolytic formation upon the hydrogen-plates and preventing the accretion thereon of short-circuiting formations, substantially as described.

3. A secondary-battery cell containing but a single pair of elements, the hydrogen element being composed in whole or in part of zinc and lying upon the bottom of the cell, mercury being present either in solution or as a constituent of the hydrogen element, the oxygen element being supported immediately above the hydrogen element in a position substantially parallel therewith and in close proximity thereto, the horizontal disposition of the elements facilitating the even distribution of precipitated metal upon the hydrogen element and preventing the accretion thereon of short-circuiting formations, substantially as described.

4. A secondary battery-cell containing but a single pair of elements, the hydrogen element being composed in whole or in part of zinc, mercury being present either in solution or as a constituent of the hydrogen element, the oxygen element being of lead and supported immediately above the hydrogen element in a position substantially parallel therewith and in close proximity thereto, the horizontal disposition of the elements facilitating the even distribution of precipitated metal upon the hydrogen element and preventing the accretion thereon of short-circuiting formations, substantially as described.

5. As a pair of elements for a secondary battery, amalgamated zinc constituting the hydrogen element and a laminated perforated plate constituting the oxygen element, substantially as described.

6. As a pair of elements for a secondary battery, amalgamated zinc constituting the hydrogen element and a laminated perforated lead plate constituting the oxygen element, substantially as described.

7. As a pair of elements for a secondary battery, a horizontal mass of amalgamated zinc constituting the hydrogen element and a laminated perforated plate constituting the oxygen element, substantially as described.

8. As a pair of elements for a secondary battery, a horizontal mass of amalgamated zinc constituting the hydrogen element and a laminated perforated lead plate constituting the oxygen element, substantially as described.

9. As a pair of elements for a secondary battery, amalgamated zinc constituting the hydrogen element and a laminated perforated plate having one or more layers of carbon between the laminæ constituting the oxygen element, substantially as described.

10. As a pair of elements for a secondary battery, amalgated zinc constituting the hydrogen element and a laminated perforated lead plate having one or more layers of carbon between the laminæ constituting the oxygen element, substantially as described.

11. As a pair of elements for a secondary battery, amalgamated zinc constituting the hydrogen element and a laminated perforated plate having one or more layers of powdered graphite between the laminæ constituting the oxygen element, substantially as described.

12. A secondary battery-cell having a pair of elements, one consisting of amalgamated granulated zinc and the other of a pole-piece supported above the same and at all points substantially equidistant therefrom, substantially as described.

13. A secondary or storage battery having a pair of horizontally-disposed elements, the active material of one of said elements consisting of an electrolytically-formed layer of zinc and mercury formed upon a substratum of zinc granules, substantially as described.

14. A secondary-battery cell having two elements, one consisting of granulated zinc lying in the bottom of the cell and the other of a pole-piece supported above the same and being at all points substantially equidistant from the other element, substantially as set forth.

15. A secondary-battery cell adapted to contain two horizontally-placed pole-pieces, one of said pole-pieces consisting of granulated material lying in the bottom of the cell and the other of a laminated plate or plates suspended above the same, substantially as set forth.

16. In a secondary battery, a hydrogen pole-piece made up of granulated material horizontally placed and held in position by a perforated plate placed over it, substantially as set forth.

17. In a secondary battery, a hydrogen pole-piece made up of amalgamated granulated zinc horizontally placed and held in place by a perforated zinc plate, substantially as set forth.

18. In a secondary battery, the combination of insulating-block F, serving to prevent contact between the conductor and the oxygen element, and corner-piece G, upon which the block F rests, substantially as described.

19. The cell A, provided with supporting corner-pieces for the plate, substantially as set forth.

20. A battery-plate made up of several metallic laminæ, one or more of which is coated with finely-divided material conductive of electricity and inactive in the battery, substantially as described.

21. A compound plate for secondary batteries, made up of laminæ fastened together and having one or more layers of conductive material inactive in the battery held between the laminæ, substantially as described.

22. A compound plate for secondary batteries, made up of laminæ fastened together and provided with perforations and having one or more layers of conductive material inactive in the battery held between the laminæ, substantially as described.

23. In a secondary battery, a perforated plate made up of laminæ fastened together and having one or more layers of carbon held between them, substantially as described.

24. A compound plate for secondary batteries, made up of laminæ fastened together and having one or more layers of carbon held between them, substantially as described.

25. In a secondary battery, a compound plate one or more of the layers of which are coated with finely-divided carbon, substantially as set forth.

26. In a secondary battery, a compound plate one or more of the layers of which are coated with graphite, substantially as set forth.

27. A battery-plate made up of alternate layers of oxidized lead and finely-divided carbon, substantially as set forth.

28. A battery-plate made up of layers one or more of which are coated with graphite in a state of fine subdivision, substantially as set forth.

29. A secondary or storage battery element made up of pieces of material intended to be active in the battery in metallic state, said pieces being coated with finely-divided carbon and fastened or suitably associated together to form the element, substantially as described.

30. A secondary or storage battery element made up of pieces of lead in metallic state, said pieces being coated upon their surfaces with graphite and suitably fastened or associated together to form the element, substantially as described.

In testimony whereof I have hereunto set my hand in the presence of two subscribing witnesses.

WILLIAM MAIN.

Witnesses:
   D. PETRI-PALMEDO,
   J. J. KENNEDY.